Jan. 12, 1932.  E. C. LOESCHE  1,840,366
CRUSHING MILL
Filed April 16, 1929   2 Sheets-Sheet 1

INVENTOR
Ernst Curt Loesche
BY
Symmestvedt and Lechner
ATTORNEYS

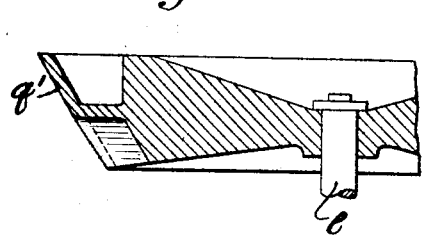
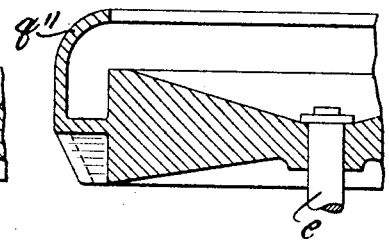
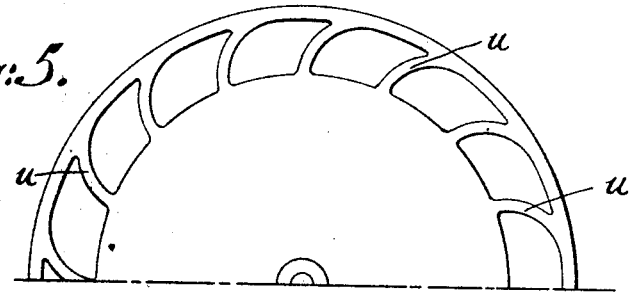
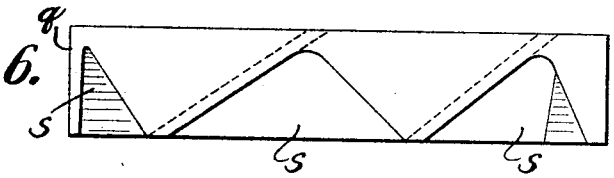
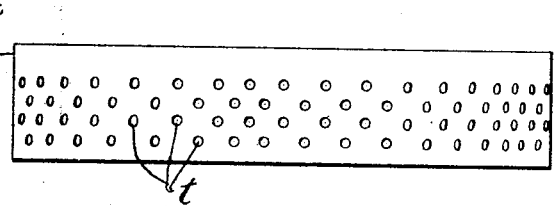

Patented Jan. 12, 1932

1,840,366

UNITED STATES PATENT OFFICE

ERNST CURT LOESCHE, OF BERLIN-LANKWITZ, GERMANY, ASSIGNOR TO INTERNATIONAL COMBUSTION ENGINEERING CORPORATION, OF NEW YORK, N. Y., A CORPORATION OF DELAWARE

CRUSHING MILL

Application filed April 16, 1929, Serial No. 355,626, and in Great Britain January 7, 1929.

The invention relates to a mill with a rotatable milling dish, and stationary milling rolls, preferably applied under spring pressure, for the grinding or crushing of various materials, such as, for example, coal or similar material.

With this mill a current of air is used in known manner for removing the fine ground material from the mill, or from that part of the mill in which the grinding takes place.

According to the invention the periphery of the milling dish is provided with a rim or trough practically open at the top, having its lower part inclined downwards in the direction of rotation and which is designed to collect the material falling over the edge of the milling dish and gathered on the bottom of the mill casing and to return it to the milling surfaces. This trough consists preferably of a number of separate compartments each one of which has its lower surface inclined downwards in the direction of rotation and acting as a scoop. The separate compartments may be so arranged on the periphery of the milling dish that their outer side or sides are concentric to the rim of the milling pan.

The bottom of the scoops may have, in addition to a tangential inclination, also a radial inclination from the inside towards the outside. The outer peripheral wall of the trough or of the separate compartments may be extended upwards and inwards in order to form a throw-off or guiding surface for the ascending material. The outer peripheral walls of the compartments may be formed as directing blades in order to again return the material to the milling dish.

The outer circumference or casing of the scoop rim may be practically vertical, that is, be essentially in the form of a cylindrical casing. It may, however, be also shaped as part of a conical casing the smaller diameter of which is below the top edge. The outer casing of the scoop rim is preferably provided with suitable openings, for example, triangular, for the inlet of the air; the outer casing may also be provided for this purpose with perforations or holes for the passage of the air.

A mill constructed according to the invention, with its principal parts, is shown as an example in the accompanying drawings.

Figure 3 shows a section in detail of a special construction of the overflow compartment, the scoop-like bottom of which has an inclination from the inside outwards and the outer wall of which forms part of a cone shaped casing opening out towards the top.

Figure 4 shows a vertical section of a special construction of the outer peripheral wall of the trough with a raised edge curved inwards.

Figure 5 is a top view of the directing blade construction of the outer circumferential wall of the compartments.

Figure 6 is a view of the scoop rim with triangular openings for the inlet of the sifting air.

Figure 7 shows the outer side of the scoop rim provided with air holes.

Figure 1:
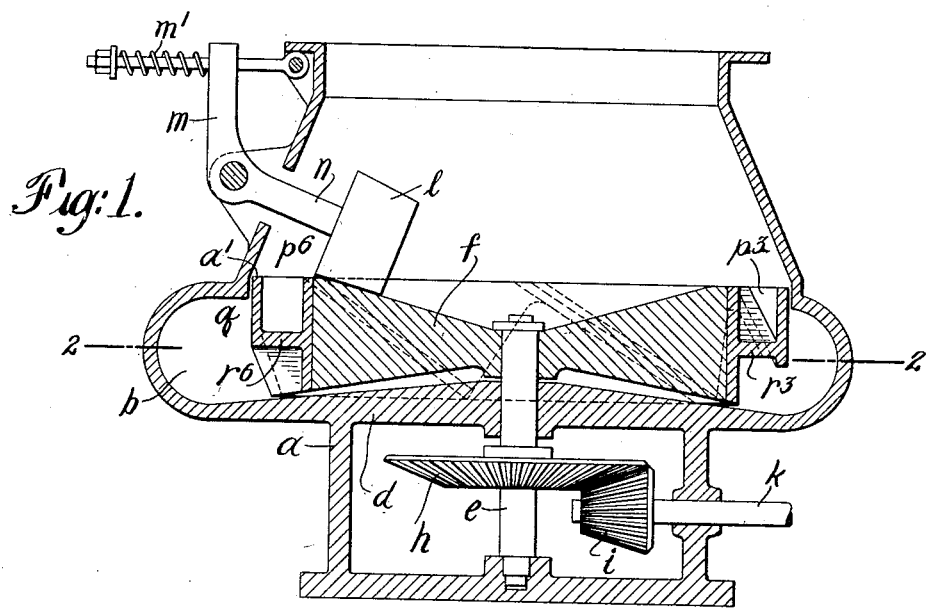
Figure 1 is a vertical section through the center of the mill, on the line 1—1 of Figure 2.
Figure 2:
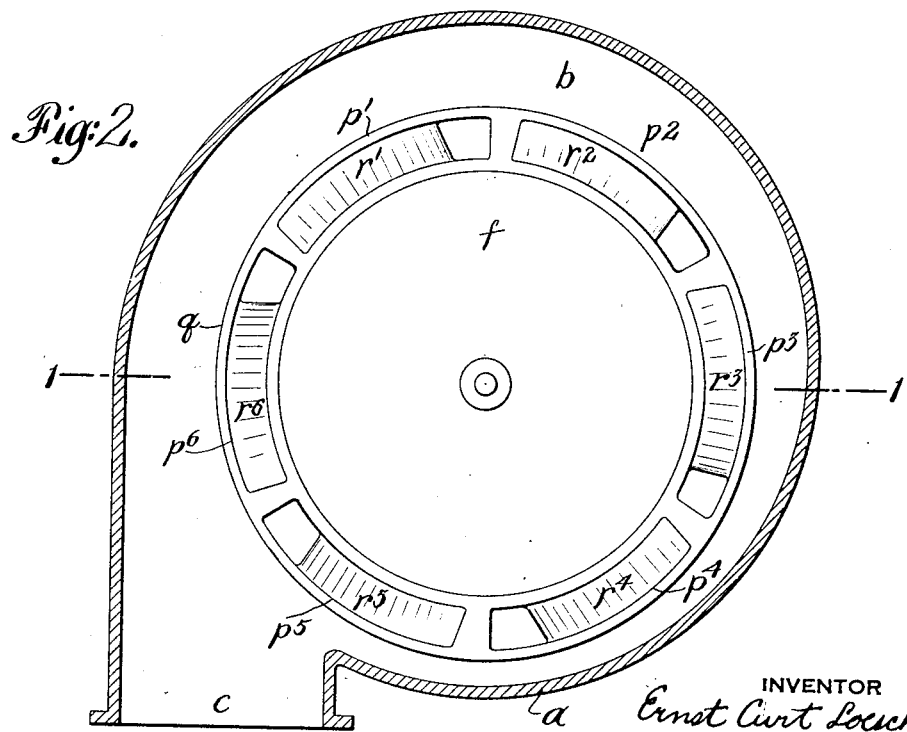
Figure 2 is a horizontal section through the mill casing on the line 2—2 of Figure 1, the milling dish being shown in plan.

The mill casing $a$ contains a spiral shaped or volute channel $b$ with an opening $c$ through which the air for winnowing the ground material enters. The reference letter $d$ indicates the bottom of the casing through which passes a vertical shaft $e$ which carries the milling dish $f$ at its upper part. On the shaft $e$ is fitted, in the foot of the mill, a bevel wheel $h$ which meshes with and is driven by a bevel wheel $i$ fitted on a driving shaft $k$. The milling roll $l$ is carried on the arm $n$ of a bell-crank lever, the other arm $m$ of which is under the influence of a spring $m^1$. By means of this arrangement the roll $l$ is forced against the milling surface. For the sake of simplicity only one roll $l$ is shown, although in practice several may be used.

The rotating milling dish $f$ carries on its periphery a trough practically open at the top, which is preferably, as shown in the drawings, subdivided into a number of compartments $p^1, p^2, p^3, p^4, p^5, p^6$. The inner side of this peripheral trough is formed by the outside wall of the milling dish and its outer side by the peripheral wall $q$. The lower surface of this trough is inclined downwards in the direction of rotation of the scoops. In the example shown, the six compartments $p^1$ to $p^6$ are provided each with a suitable lower surface $r^1, r^2, r^3, r^4, r^5, r^6$, respectively. The outer peripheral wall $q$, preferably at $a^1$, runs close up to the mill casing so as to give a certain amount of protection against the inlet of any large quantities of air. The inclined bottom surfaces $r^1$ to $r^6$ form open scoops which describe a circular path at a small distance from the bottom $d$ of the casing, and serve to collect from the bottom of the casing any material which has found its way there and to deflect the winnowing air entering through the opening $c$ into the circular channels. For the better inlet of the winnowing air to the compartments $p^1$ to $p^6$ the outer circular wall $q$ may be provided with perforations or holes $t$ as shown in Figure 7.

As shown in Figure 3, the outer circular wall $q'$ of the scoop rim may represent surfaces of a cone, the point of which lies underneath. By these means the movement upwards of the material is assisted by centrifugal action.

In order to obtain a better guidance of the material by means of the outer circular wall of the scoop rim, it is preferable, as shown in Figure 4, to extend this outer wall $q''$ and curve it inwards.

As shown in Figure 5, the lower and outer surfaces of the separate compartments may be constructed in the form of deflecting blades.

The method of operation of the apparatus is as follows:

The material is supplied to the milling dish $f$, by means of any suitable feed apparatus, not shown. The rotation of the milling dish causes the material to travel from the center towards the rim, so that the material is ground between the milling dish $f$ and the rolls $l$.

The winnowing air enters through the opening $c$ into the channel $b$. From this channel it passes principally through the cut-out parts $s$ or the openings $t$ into the separate scoop compartments, and flows, following the upwardly directed lower surfaces, into the milling space. The winnowing air carries with it upwardly the part of the material which has been sufficiently finely ground. The separation of the air and the prepared ground material then takes place by usual apparatus, not shown. The coarser material is only lifted a short distance by the winnowing air and falls on the milling dish for further treatment.

That part of the material which falls over the rim of the milling dish against the action of the winnowing air and reaches the bottom $d$ of the casing $a$ is collected by the rotating inclined scoops or lower surfaces of the compartments $p^1$ to $p^6$ and conveyed upwards again on to the milling dish, the winnowing air assisting this upward movement.

I claim:

1. A mill comprising a casing, a milling dish within the casing, and a plurality of milling rolls adapted to engage the milling dish, said milling dish having a peripheral trough open at the top, and said trough having a lower surface inclined downwardly in the direction of rotation adapted to convey material entering the trough back to the milling surface of the dish.

2. A mill comprising a casing, a milling dish within the casing, and a plurality of milling rolls adapted to engage the milling dish, said milling dish having a peripheral trough open at the top, and said trough having an opening in the bottom and having a lower surface inclined downwardly to said opening in the direction of rotation adapted to convey material collecting in the bottom of the mill casing back to the milling surface.

3. A mill comprising a casing, a circular milling dish within the casing, a plurality of milling rolls adapted to engage the milling dish, a trough carried by the dish peripherally thereof and having an open top, means for dividing said trough into a plurality of compartments each having a lower surface inclined downwardly in the direction of rotation.

4. A mill comprising a casing, a circular milling dish within the casing, a plurality of milling rolls adapted to engage the milling dish, a trough carried by the dish peripherally thereof and having an open top, means for dividing said trough into a plurality of compartments each having a lower surface inclined downwardly in the direction of rotation and also inclined radially from the inside to the outside.

5. A mill comprising a casing, a milling dish within the casing, and a plurality of milling rolls adapted to engage the milling dish, said milling dish having a peripheral trough open at the top, and said trough having a lower surface inclined downwardly in the direction of rotation adapted to convey material entering the trough back to the milling surface of the dish, together with means associated with the trough at the outer periphery thereof to deflect material tending to rise back to the milling dish.

6. A mill comprising a casing, a circular milling dish within the casing, a plurality of milling rolls adapted to engage the milling dish, a circular shell spaced from the periphery of the milling dish, and means for connecting said shell to the milling dish including a plurality of blades located in the aforesaid space and inclined in a direction to direct material leaving the dish back to the dish.

7. A mill comprising a casing, a milling dish within the casing, and a plurality of milling rolls adapted to engage the milling dish, said milling dish having a peripheral trough open at the top, and said trough having a lower surface inclined downwardly in the direction of rotation adapted to convey material entering the trough back to the milling surface of the dish, and the outer wall of said trough being of conical form, the smaller diameter of which is at the bottom.

8. A mill comprising a casing, a circular milling dish within the casing, a plurality of milling rolls adapted to engage the milling dish, a circular shell spaced from the periphery of the milling dish, and means for connecting said shell to the milling dish including a plurality of blades located in the aforesaid space and inclined in a direction to direct material leaving the dish back to the dish, the aforesaid circular shell being provided with openings for the inlet of winnowing air, and the aforesaid casing having an inlet for the introduction of the air.

In testimony whereof I have hereunto signed my name.

ERNST CURT LOESCHE.